(12) United States Patent
Johnson (10) Patent No.: US 6,275,919 B1
(45) Date of Patent: Aug. 14, 2001

(54) MEMORY STORAGE AND RETRIEVAL WITH MULTIPLE HASHING FUNCTIONS

(75) Inventor: Peter Johnson, Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/173,575

(22) Filed: Oct. 15, 1998

(51) Int. Cl.[7] ............... G06F 12/00; G06F 13/00
(52) U.S. Cl. ............... 711/216; 711/100; 711/200
(58) Field of Search ............... 711/216, 100, 711/200; 709/213, 200, 211, 212

(56) References Cited

U.S. PATENT DOCUMENTS

| | | | |
|---|---|---|---|
| 5,027,350 | * | 6/1991 | Marshall ............... 370/401 |
| 5,339,398 | * | 8/1994 | Shah et al. ............... 711/216 |
| 5,509,135 | * | 4/1996 | Steely, Jr. ............... 711/147 |
| 5,530,958 | * | 6/1996 | Agarwal et al. ............... 711/3 |
| 5,608,801 | * | 3/1997 | Aiello et al. ............... 380/46 |
| 5,692,177 | * | 11/1997 | Miller ............... 707/8 |

\* cited by examiner

*Primary Examiner*—Tuan V. Thai
(74) *Attorney, Agent, or Firm*—Blakely, Sokoloff, Taylor & Zafman LLP (57) ABSTRACT

A method and apparatus for using a hashing function to store data in a cache memory. Briefly, a method and apparatus is provided for using a hashing function to store data in a cache memory where the hashing function used is changed periodically. In one embodiment, the cache memory stores the data, an indicator of the hashing function used and the index value generated by the hashing function used. To retrieve data from the cache memory, the current hashing function is used to generate an index for the incoming data. The data at the index is checked to determine whether the stored data matches the incoming data. If the data at the index generated by the current hashing function does not match the incoming data, previous hashing functions are used to repeat the search.

18 Claims, 6 Drawing Sheets

MEMORY STORAGE AND RETRIEVAL WITH MULTIPLE HASHING FUNCTIONS

FIELD OF THE INVENTION

The present invention relates to storing information to and retrieving information from a memory. More particularly, the present invention relates to storing and retrieving data from memories using hashing functions.

BACKGROUND OF THE INVENTION

A hashing function is a function that transforms a key value into a table index. The table index is often referred to as a hash value. The key value typically contains more bits than the table index.

As applied to a memory, an incoming datum contains a key value, the memory is the table, and the memory address where the incoming datum is stored is the table index. The table index can be the key value, or a hash value generated by a hashing function. A smaller table can be used when the table index is a hash value, since the hash value has fewer bits than the key value. When the table index is generated by a hashing function, multiple key values will map onto a single table index. This is known as a hash collision. Two prior art solutions to accommodate hash collisions include open chaining and closed chaining.

In an open chaining scheme, each location in the memory may be a data structure, such as a linked list, that is capable of storing multiple entries. When a hash collision occurs, all entries with the same table index are stored in the same data structure (e.g., in the same linked list). Conceptually, open chaining results in a memory that is a set of lists. To retrieve the data, all the entries in the list for a particular hash value have to be searched. If the list is large, the search may be very time consuming.

In a closed chaining scheme, when a hash collision occurs the incoming data causing the collision is stored in an entry in the memory that is subsequent to the location to which the key value hashed. This subsequent entry may be the next sequential memory location or may be the next location available sequentially after all other locations currently storing information that is associated with a hash value to the same location or all other locations already being used. To retrieve the information, the memory must be searched from the location corresponding to the table index to the next empty entry in the memory to determine whether that particular entry exists in the memory. Therefore, in large or frequently changing memories, retrieval of data can become time consuming as it is possible that a large portion of a memory may have to be searched.

Memories are often used with bridges in a communication network to store addresses of local devices. By storing the addresses of local devices, the bridge can determine whether to forward packets of information onto other parts of the network, an event which may waste resources and is undesirable. Such a bridge checks the destination address of the packet with previous source addresses stored in its memory to determine the destination address is local to the bridge. If so, the bridge need not forward the packet to other parts of the network, so that part of the network doesn't have to perform the unnecessary function of transmitting a packet whose recipient is on another portion of the network.

One way to reduce the size of these bridging devices is to reduce the size of their memory. However, reduction in the size of the memory may cause some of the same problems discussed above with respect to hashing as given above.

Another way to improve the performance of these bridges is to store and retrieve addresses more quickly.

What is needed is an improved memory management strategy for use in memories that store and retrieve information based on hash values.

SUMMARY OF THE INVENTION

A method and apparatus for use of multiple hashing functions in a memory is described. A first index value is determined for a first set of incoming data during a first preselected time period. The first index value generated is according to a first hashing function. The first set of incoming data is stored in a cache memory based on the first index value. A second index value is determined for a second set of incoming data during a second preselected time period. The second index value is generated according to a second hashing function. The second set of incoming data is stored in the memory based on the second index value. This process may continue for subsequent time periods.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for using multiple hashing functions for storing information to and retrieving information from a memory is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Briefly, the present invention provides for using a hashing function to access a memory where the hashing function is changed periodically to avoid hash collisions. By using the different hashing functions, the same input will not produce the same resulting index value, and thus avoid collisions. In one embodiment, the number of different hashing functions is large. In fact, the number of hashing function may be such that they are not reused during periods of time that a device is in active operation. Also, in one embodiment, the hashing function is changed at a sub-interval within the period of time a bridging device removes addresses of previously identified local devices that have had not activity for a period of time. However, this is discussed in greater detail below. In one embodiment, the memory stores the data and an indicator of the hashing function used in the memory at a location corresponding to the index value generated by the hashing function. This enables regeneration of the key value using the correct hashing function.

As used herein, "memory" refers to a broad category of storage devices including, but not limited to, lookup tables, traditional memories (e.g., cache memories, etc.), register sets, etc.

To retrieve data from the memory, the current hashing function is used to generate an index for the incoming data. The data at the index is checked to determine whether the stored data matches the incoming data. If the data at the index generated by the current hashing function does not match the incoming data, previous hashing functions are used to repeat the search. This is advantageous because it limits the number of searches to a fixed number. In another embodiment, such searches may be performed in parallel.

In one embodiment, the memory and the use of periodically changing hashing functions occurs in a bridge, or other device(s), such as a bus or communication interface device. In one embodiment, such a device operates in an environment having one or more of the following conditions: 1) occasional "false negative" results are acceptable; 2) entries exist for a limited amount of time; 3) the granularity of entry expiration is course; and 4) the memory is sparsely populated. These four conditions are often satisfied in network bridging devices. The four conditions and relationship of the conditions use of multiple hashing functions with memories is described in greater detail below. It is important to note that all four of the above conditions are not required to practice the present invention; however, satisfaction of the four conditions increases operating speed of the associated memory.

Figure 1:
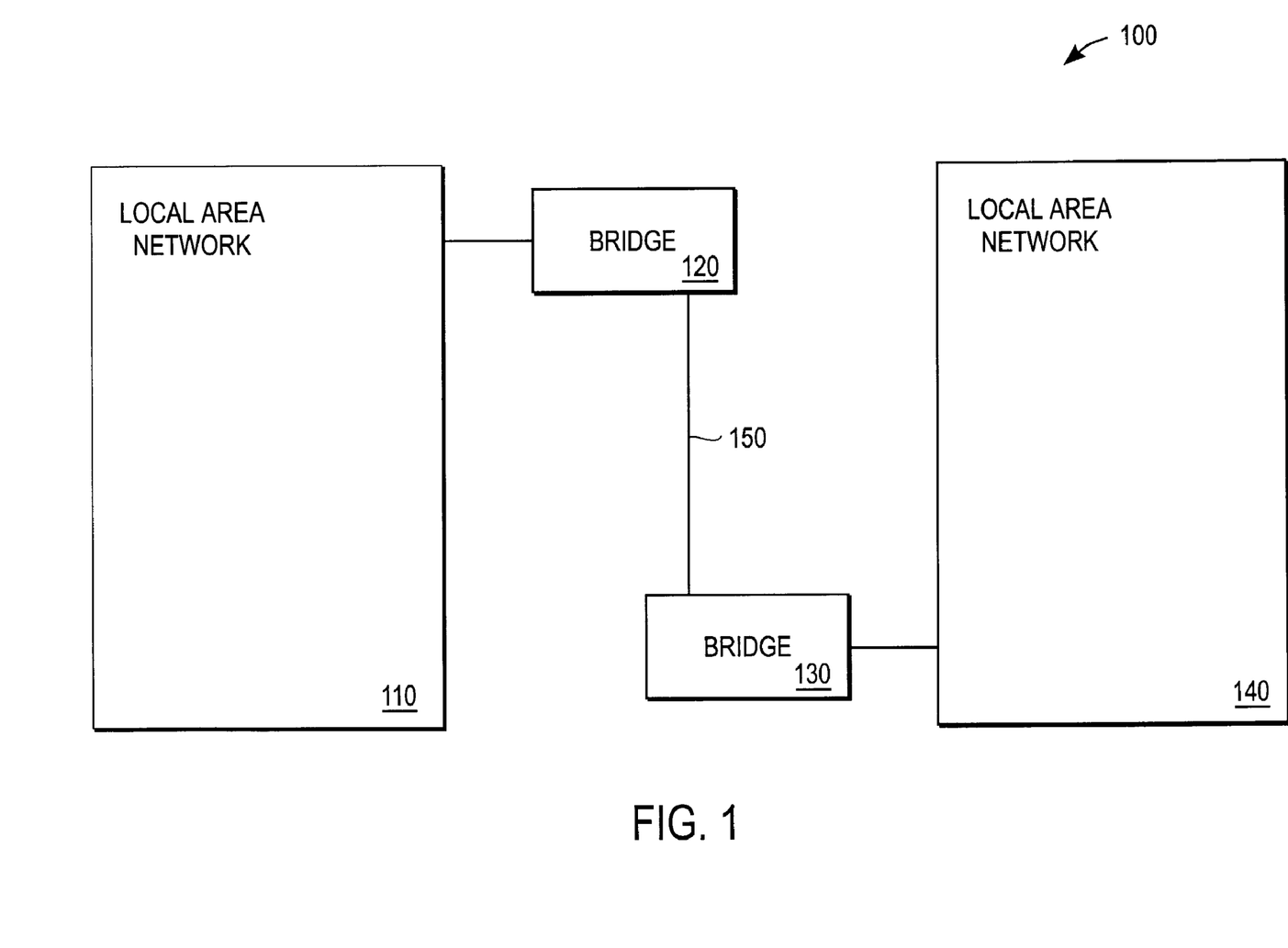
FIG. 1 is one embodiment of a wide area network having two local area networks.

FIG. 1 is one embodiment of a wide area network having two local area networks (LANs). The configuration of FIG. 1 is used for purposes of simplicity of description and more than two LANs can be used to provide wide area network 100.

Local area network 110 provides an interconnection of one or more computer systems and/or other devices, such as, for example, printers and modems (not shown in FIG. 1). In one embodiment, local area network 110 is an Ethernet-based network that operates at speeds up to 100 Megabits/second according to IEEE standard 802.3u-1995 and IEEE standard 802.3x&y-1997; however, any type of networking protocol can be used to implement local area network 110.

Local area network 140 is geographically remote with respect to local area network 110. Local area network 140 provides an interconnection between one or more computer systems and/or other devices (not shown in FIG. 1). In one embodiment, local area network 140 is also an Ethernet-based network that operates at speeds up to 100 Megabits/second in a manner similar to local area network 110. Local area network 140 can be any type of network and is not required to use the same networking protocol as local area network 110.

Local area networks 110 and 140 are interconnected though bridge 120, bridge 130 and communications path 150. In one embodiment, communications path 150 is a T-1 communications line operating at speeds up to 1.5 Megabit/second; however other communications paths can also be used.

Bridges 120 and 130 provide connections between LANs. In one embodiment, bridge 120 monitors network traffic on local area network 110 and passes only messages destined for devices that have not generated messages on local area network 110 to communications path 150. Similarly, bridge 130 monitors traffic on local area network 140 and passes only messages to devices that have not generated messages on local area network 140 to communications path 150. Because communications path 150, which is slower than the LANs and thus acts as a WAN bottleneck, communications path 150 is used only when necessary. Use of communications path 150 only when necessary provides more efficient utilization of communications path 150 and better overall performance of WAN 100 than if every message from each LAN is communicated to one or more other LANs.

In order to provide more efficient utilization of communications path 150, learning bridges are used that "learn" the location of a device within a LAN coupled to the bridge. Learning bridges eliminate the necessity of registering each device of a particular LAN with each corresponding bridge. However, learning bridges must "forget" the location of devices periodically to allow a device that is moved between LANs to function properly in the new location. For example, if a user of a mobile computer system removes the mobile computer system from local area network 110 and moves the mobile computer system to local area network 140, the bridge must "forget" the old location and "learn" the new location to provide proper message distribution and efficient use of communications path 150.

In one embodiment, bridges learn by monitoring the source address of each message sent over the associated LANs. When a message originates from a particular device, that device is necessarily coupled to the LAN on which the message was sent. In one embodiment, the location learned from the source address is valid for a predetermined period of time, such as, for example, five minutes; however, other time periods can also be used. Each time a device generates a message the source address is stored. In this manner, the location of known devices is "refreshed." In other words, if a device has not generated a message for over five minutes the location of the device on the LAN is forgotten. This allows a device to physically move between LANs and receive messages properly.

Because bridges are constantly learning the location of devices on LANs, wide area network 100 tolerates "false no" conditions that result from messages being improperly forwarded. A false no condition can occur if, for example, a bridge forwards a message and the destination device is coupled to the LAN on which the message originates. The false no results in unnecessary use of resources but does not cause a computational error.

In one embodiment, bridges include a memory that stores the location of devices coupled to LANs associated with the bridge. The source address in each message is used to update the memory to indicate the location of the device generating the message. The destination address of each message is used to index the memory to determine whether the message should be forwarded to communications path 150.

In one embodiment, a hashing function is used with the address of a device as the key to index the memory. The hashing function is changed periodically in order to reduce hashing collisions. In one embodiment, hashing functions are changed every 30 seconds; however, other intervals can also be used. In one embodiment, the change interval represents a sub-interval of the time period in which a bridge or other similar device "forgets" locations of devices during which no activity has occurred. In one embodiment, to reduce hashing collisions, hashing functions have the following property:

if $h_i(k_1)=h_i(k_2)$ then $h_j(k_1)\neq h_j(k_2)$ for most $i$ and $j$.

In other words, keys that map to the same index for a first hashing function map to different indices for a second hashing function in most cases.

In one embodiment, any hashing collisions that occur are ignored. Data is written to the index generated by the hashing function regardless of whether a hashing collision has occurred. This policy results in some lost data; however, because of the property described above, repeated hashing collisions that can cause thrashing are eliminated and the amount of data lost is reduced as compared to sets of hashing functions that do not conform to the property described above.

Figure 2A:
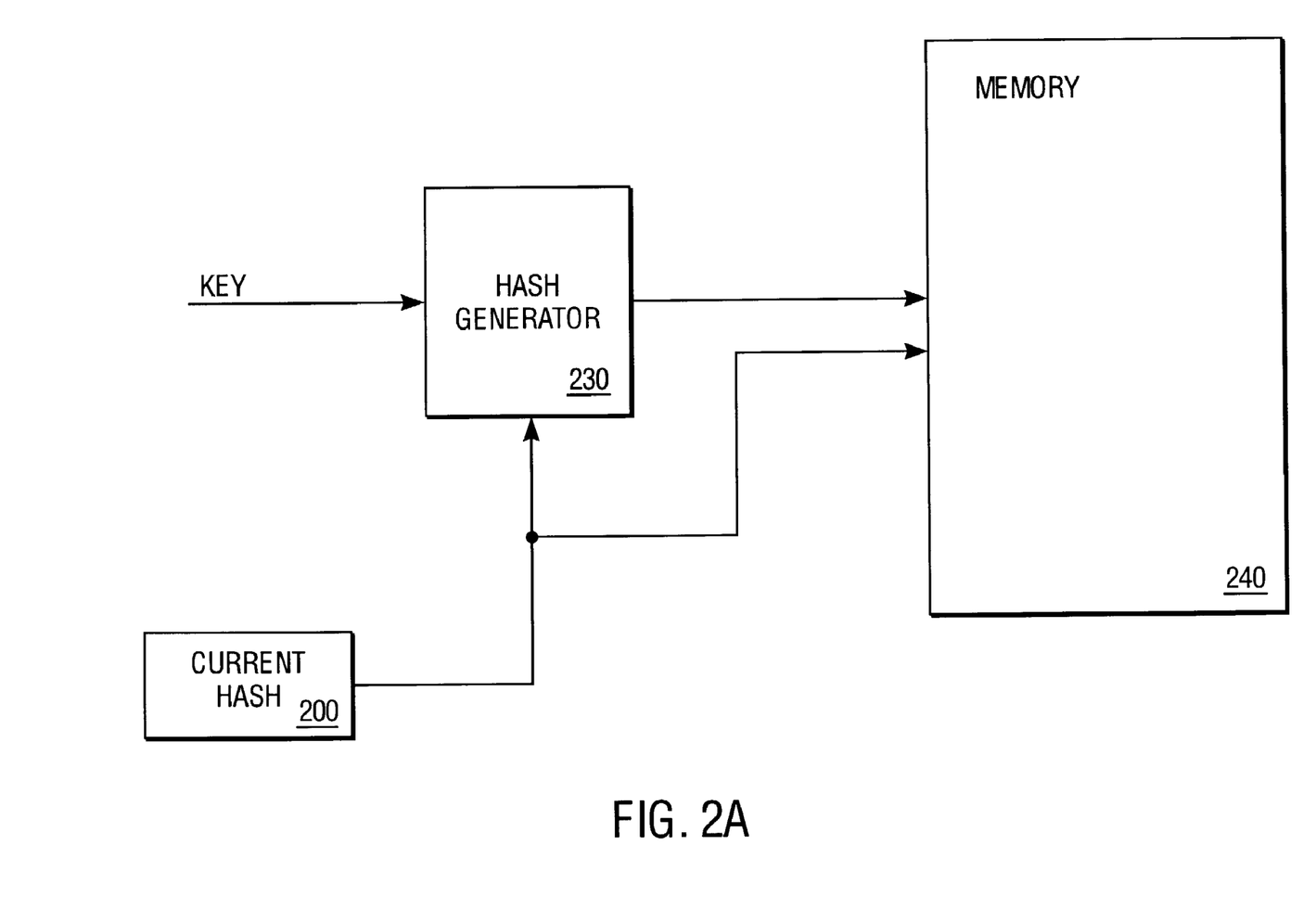
FIG. 2A is one embodiment of a circuit to store data in a cache memory using a hashing function that changes periodically.

FIG. 2A is one embodiment of a circuit to store data in a memory using a hashing function that changes periodically. Hash generator 230 receives a key value and generates a hash index value. In one embodiment, the key value is a source device identifier from a network message; however, other values can also be used. In one embodiment, hash generator 230 generates the hash index value according to a hashing function number.

In one embodiment, the hash function number is generated by current hash register 200; however, other circuit configurations can also be used. Current hash register 200 stores the number of the hash function currently used by hash generator 230. In one embodiment, the output of current hash register changes every 30 seconds, which causes hash generator 230 to change hashing functions every 30 seconds. Of course, other time periods can be used.

To store a value in memory 240, hash generator 230 receives a hash function number from current hash register 200 and a key value. Hash generator 230 generates a hash index based on the key value and the hash function number. The hash index indicates the memory location in which the key value is to be stored. In one embodiment, the key value and the hash function number are stored at the memory location indicated by the index value.

In one embodiment, incoming data is stored at the memory location indicated by the index value whether or not a hash collision has occurred. In other words, the incoming data is stored in the memory location generated by hash generator 230 regardless of what data has been stored at the location and the hashing function that generated the index value.

Figure 2B:
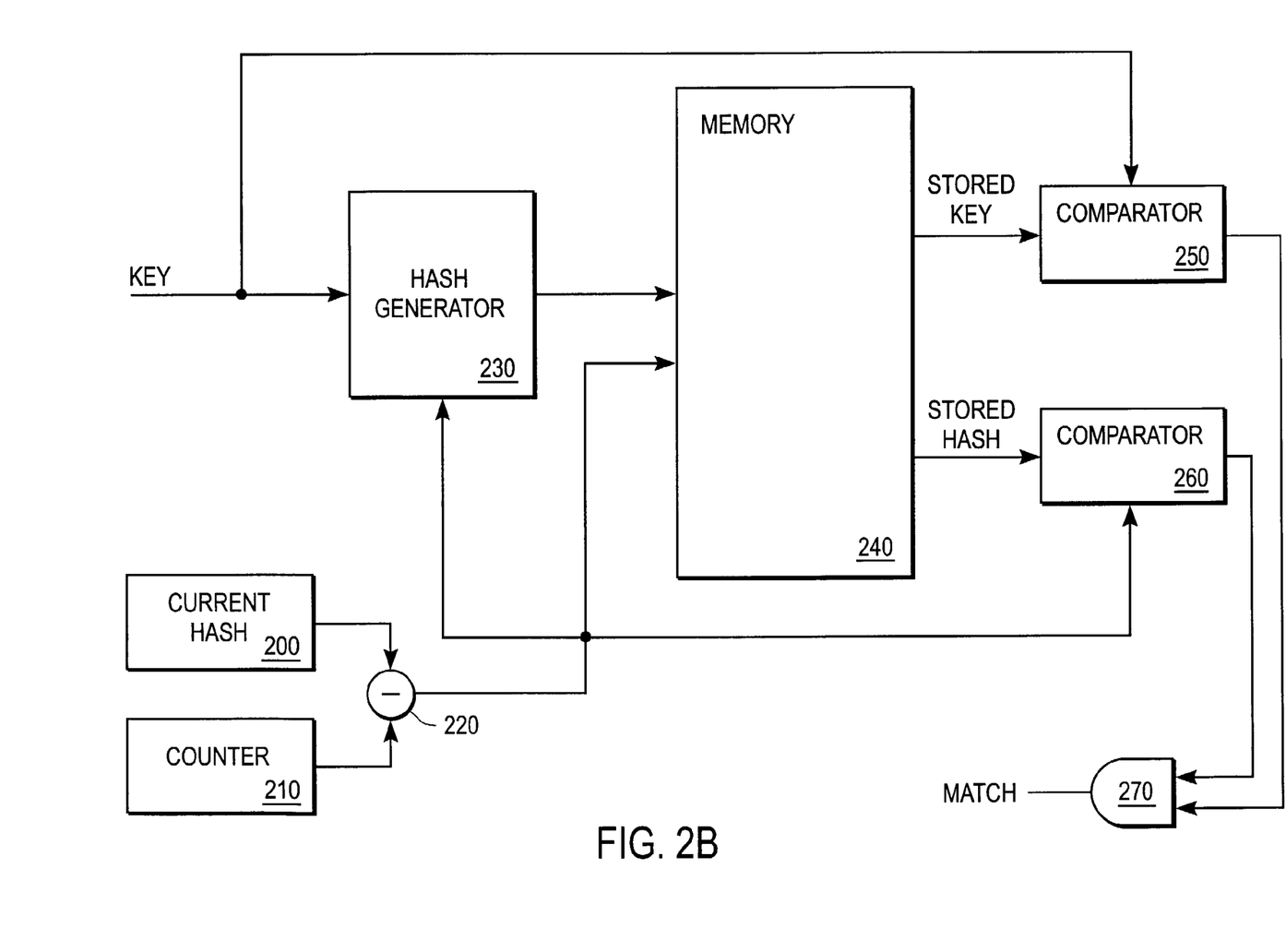
FIG. 2B is one embodiment of a circuit for retrieving data from a cache memory where data is stored using a hashing function that changes periodically.

FIG. 2B is one embodiment of a circuit for retrieving data from a memory where data is stored using a hashing function that is changed periodically. To determine whether a key value is stored in memory 240, the key value is input to hash generator 230 along with the current hash function number. Hash generator 230 generates a hash index value based on the key value and the hash function number. Memory 240 outputs a stored key value and a stored hash function number in response to the inputs supplied.

Comparator 250 is coupled to receive the stored key value from memory 240 and the key value being checked. If the stored key value and the key value being checked match, comparator 250 generates an output signal indicating a key match. Otherwise, comparator 250 generates an output signal indicating a key miss.

Similarly, comparator 260 is coupled to receive a stored hash function number and the hash function number. If the stored hash function number and the hash function number match, comparator 260 generates an output signal indicating a hash function number hit. Otherwise, comparator 260 generates an output signal indicating a hash function number miss.

In one embodiment, the output signals from comparator 250 and comparator 260 are input to AND gate 270; however, other logic elements can also be used. If a key value hit and a hash number hit occur simultaneously, AND gate 270 generates a MATCH signal. Otherwise, the MATCH signal is not asserted. Thus, if the key value indicated by a hashing function and the number of a hashing function match the stored key value and the hashing function that caused the key value to be stored at the particular memory location, a MATCH occurs and the key value retrieved is assumed to be the key value being searched for.

In one embodiment, if the first hash function used to check memory 240 for a particular key value does not result in the particular key value, previous hashing functions are used to perform similar checking operations. Previous hashing functions need only be checked as far as valid key values exist. For example, if key values stored in memory 240 are valid for five minutes and hash function numbers are changed every 30 seconds, ten hash function numbers exist for the valid time period.

Thus, hash function values are regressively used until either a match occurs or the number of valid hash function numbers are exhausted. In one embodiment, to generate previous hash function numbers, counter 210 counts from zero to the number of hash function number for the valid period, ten in the example above. The output of counter 210 is subtracted from the output of current hash register 200 by subtractor 220. The output of subtractor 220 is input to hash generator 230, memory 240 and comparator 260.

To improve performance, searches can be performed in parallel. For example, ten parallel memories can be used so that searches for the valid time period can all be performed in parallel. Alternatively, two searches can be performed in parallel to cut in half the number of searches required to cover the valid time period.

Figure 3:
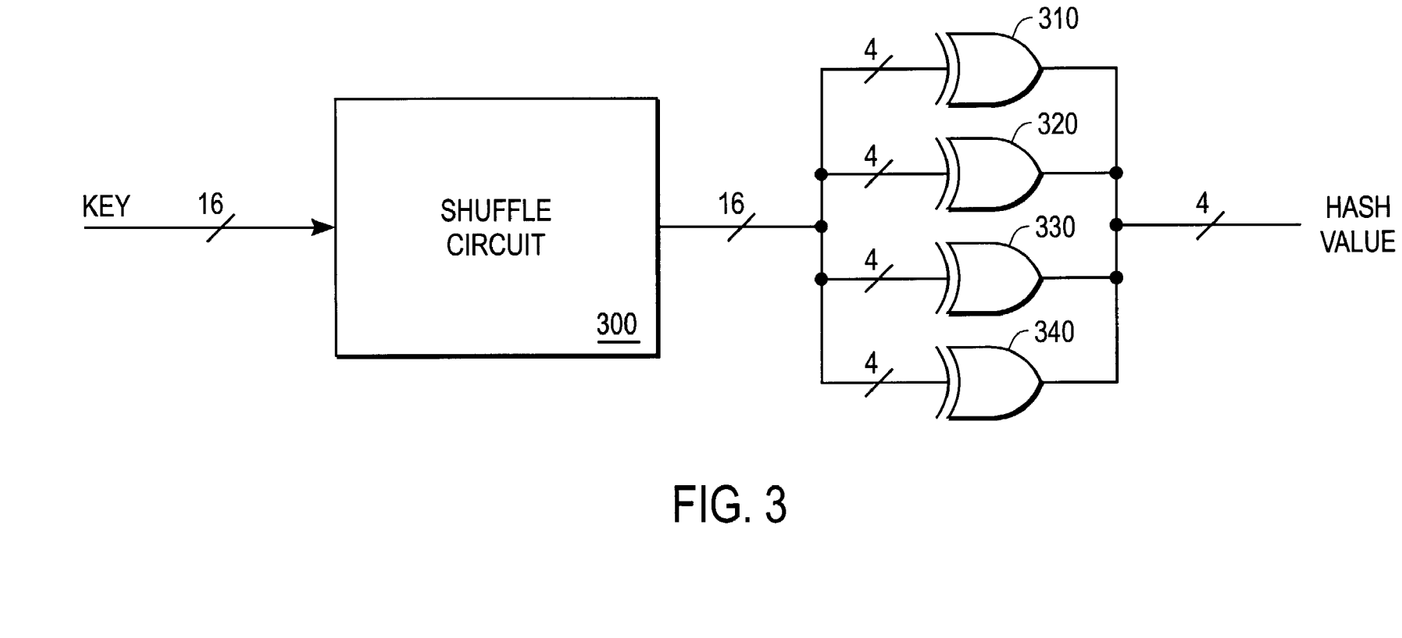
FIG. 3 is one embodiment of a hash generation circuit.

FIG. 3 is one embodiment of a hash generator. While described in terms of a shuffle circuit and exclusive OR (XOR) gates, the hash generator can be implemented by other hash generation circuits. Any hash generation circuit meeting the conditions described above can be used to implement the present invention. The example of FIG. 3 describes a 16-bit key value and a 4-bit hash value; however, both the key value and the hash value can be other sizes.

In one embodiment, the 16-bit intermediate value provides the inputs for four 4-bit XOR gates labeled 310, 320, 330 and 340. The 4-bit hash value is the output of XOR gates 310, 320, 330 and 340. The hash value provides the index for the key value supplied as input to shuffle circuit 300. By using a different number of XOR gates, a different size hash value can be generated.

In one embodiment, shuffle circuit 300 receives a 16-bit key value and generates a 16-bit intermediate value. The 16-bit intermediate value is a rearrangement of the 16 bits that comprise the key value. In other words, the number of bits have the value 1 set and the number of bits that have the value 0 are the same for the key value and for the intermediate value.

In alternative embodiments, software components can be used to provide functionality of the present invention. Because software environments typically do not provide simple bitwise functionality, a software implementation of the present invention can be used for groups of bits, such as bytes. For example, the shuffle circuits could be designed to operate on bytes instead of bits.

Figure 4:
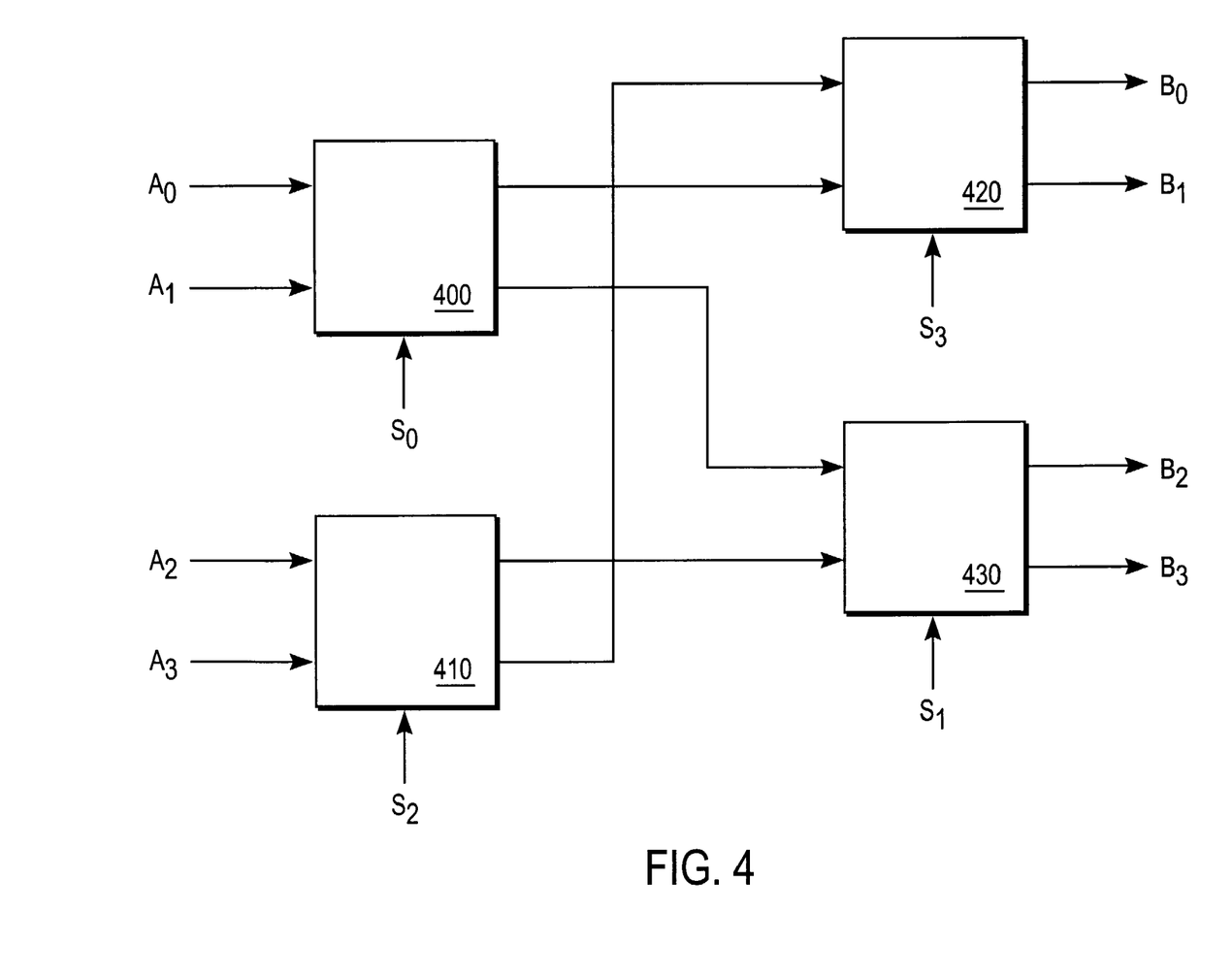
FIG. 4 is one embodiment of a shuffle circuit.

FIG. 4 is one embodiment of a shuffle circuit. In general, the shuffle circuit receives input values (e.g., A0, A1, A2, A2) and control values (e.g., S0, S1, S2, S3) and generates output values (e.g., B0, B1, B2, B3). In one embodiment, the input values correspond to the key value, the control values correspond to the hash function number and the output values correspond to the intermediate value.

In one embodiment, the shuffle circuit includes multiple switching elements (e.g., 400, 410, 420, 430). In a two-input configuration, the switching elements have the property that when the corresponding select signal is asserted the switching element the two input signals are passed directly across to the output. When the select signal is not asserted, the two output signals corresponding to the two input signals being switched, or crossed. In other words, a first output signal corresponds to a first input signal when the select signal is asserted and to a second input signal when the select signal is not asserted. Of course, other variations of the switching circuits of FIG. 4 can be used, including more than two input signals, more than two output signals, and multiple select signals.

In the example of FIG. 4, the 4-bit shuffling circuit can select 16 permutations from the 24 (4!) possible permutations. Thus, the shuffling circuit of FIG. 4 can provide 16 hashing functions.

Figure 5:
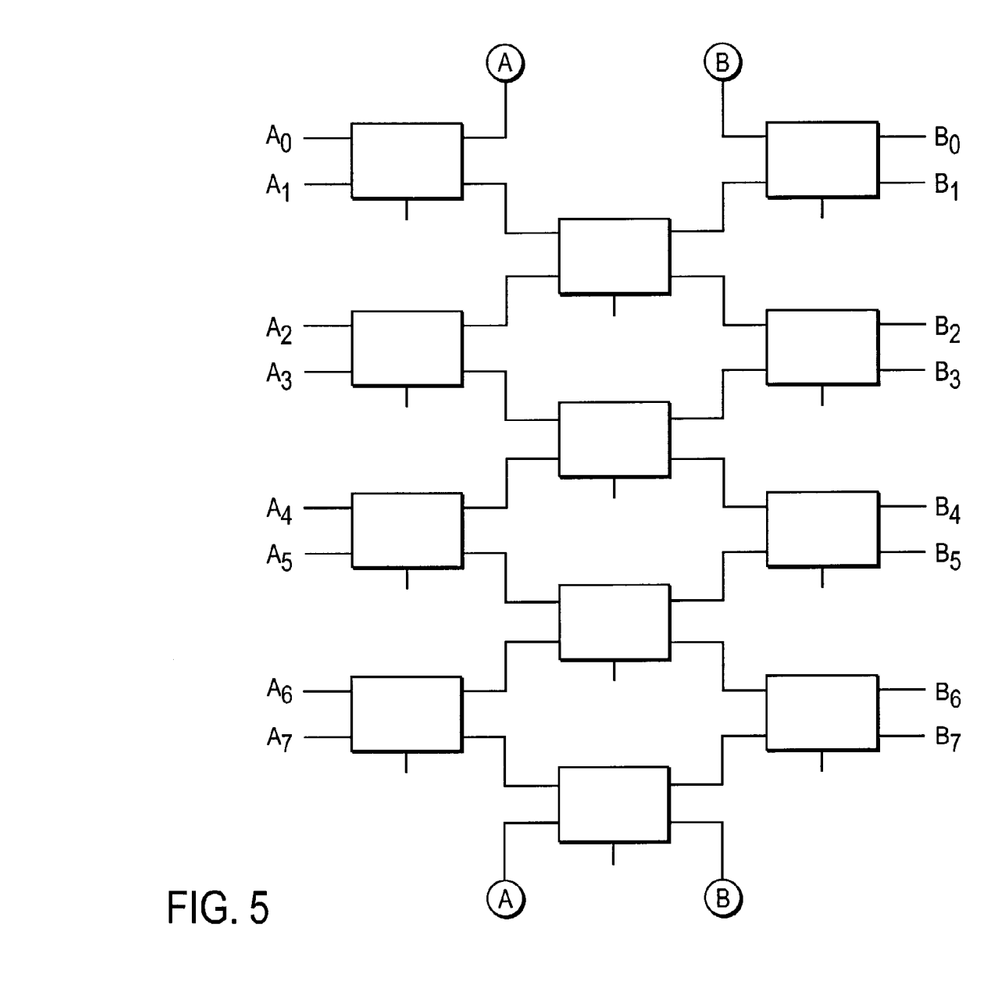
FIG. 5 is another embodiment of a shuffle circuit.

Another example of a shuffling circuit is shown in FIG. 5. Referring to FIG. 5, an 8-bit shuffling circuit has 12 switching elements, and, thus, 12 state bits to select $2^{12}$ different shuffles of the input bits to the output bits.

Of course, a shuffling circuit having any number of switching elements can be implemented. The number of input signals and hashing functions provided depends, in part, on the size of the memory in which data is to be stored. In general, for an n-bit input value, (n)log(n) switching elements are used with (n)log(n) control bits. This results in $2^{n \log(n)}$ hashing functions.

There are a number of memory optimizations that may be used within the hashing functions being performed. In the general case, the source address and the hash function must be stored for each entry in the table. These are required to verify that the hashed address really is the one stored at the hash location, and the hash function is needed to assure that the entry is still valid.

In performing the verification operation the key value (e.g., address) stored in memory is compared to the incoming key value. Requiring the entire address to be stored can be avoided. In one embodiment, all of the address bits are not stored. When the hash value comes from scrambled address bits, we can reconstruct the full address from the hash value and some of the address bits.

i.e., suppose a 3 bit value is hashed to 1 bit or $h_0 = a_0 \oplus a_1 \oplus a_2$ then one only needs to store two address bits because from any two and the hash value we can reconstruct the third.

$a_2 = h0 \oplus a_0 \oplus a_1$

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   determining a first index value for a first set of incoming data during a first preselected time period, the first index value generated according to a first hashing function using a hash generator configurable to providing a plurality of hashing functions;
   storing the first set of incoming data in a memory based on the first index value, and storing an indication that the first hashing function generated the first index value;
   changing the hash generator, in response to an input, from providing the first hashing function to providing a second hashing function;
   determining a second index value for a second set of incoming data during a second preselected time period, the second index value generated according to the second hashing function; and
   storing the second set of incoming data in the memory based on the second index value, and storing an indication that the second hashing function generated the second index value.

2. The method defined in claim 1 where the first and second preselected time periods are subintervals within a period of time a bridge removes addresses of previously identified local devices that have not had activity for a period of time.

3. The method of claim 1 wherein the indication that the first hashing function generated the first index value comprises a register value.

4. The method of claim 1 wherein the indication that the second hashing function generated the second index value comprises a register value.

5. The method of claim 1, wherein when the first set of incoming data and the second set of incoming data are equivalent, the first index value and the second index value are not equivalent.

6. The method of claim 1, wherein the first set of incoming data is a first packet source address and the second set of incoming data is a second packet source address.

7. The method defined in claim 1 wherein changing the hash generator from providing the first hashing function to providing a second hashing function occurs periodically.

8. The method defined in claim 7 wherein the period is 30 seconds.

9. The method defined in claim 1 further comprising ignoring hash collisions.

10. An apparatus comprising:
    means for determining a first index value for a first set of incoming data during a first preselected time period, the first index value generated according to a first hashing function using a hash generator configurable to providing a plurality of hashing functions;
    means for storing the first set of incoming data in a memory based on the first index value further comprising means for storing an indication that the first hashing function generated the first index value;
    means for changing the hash generator, in response to an input, from providing the first hashing function to providing a second hashing function;
    means for determining a second index value for a second set of incoming data during a second preselected time period, the second index value generated according to the second hashing function; and
    means for storing the second set of incoming data in the memory based on the second index value further comprising means for storing an indication that the second hashing function generated the second index value.

11. The apparatus defined in claim 10 where the first and second preselected time periods are subintervals within a period of time a bridge removes addresses of previously identified local devices that have not had activity for a period of time.

12. The apparatus of claim 10 wherein the indication that the first hashing function generated the first index value comprises a register value.

13. The apparatus of claim 10 wherein the indication that the second hashing function generated the second index value comprises a register value.

14. The apparatus of claim 10 wherein when the first set of incoming data and the second set of incoming data are equivalent, the first index value and the second index value are not equivalent.

15. The apparatus of claim 10 wherein the first set of incoming data is a first packet source address and the second set of incoming data is a second packet source address.

16. The apparatus defined in claim 10 wherein the means for changing the hash generator from providing the first hashing function to providing a second hashing function operates periodically.

17. The apparatus defined in claim 16 wherein the period is 30 seconds.

18. The apparatus defined in claim 10 wherein hash collisions are ignored.

\* \* \* \* \*